Figure 1:
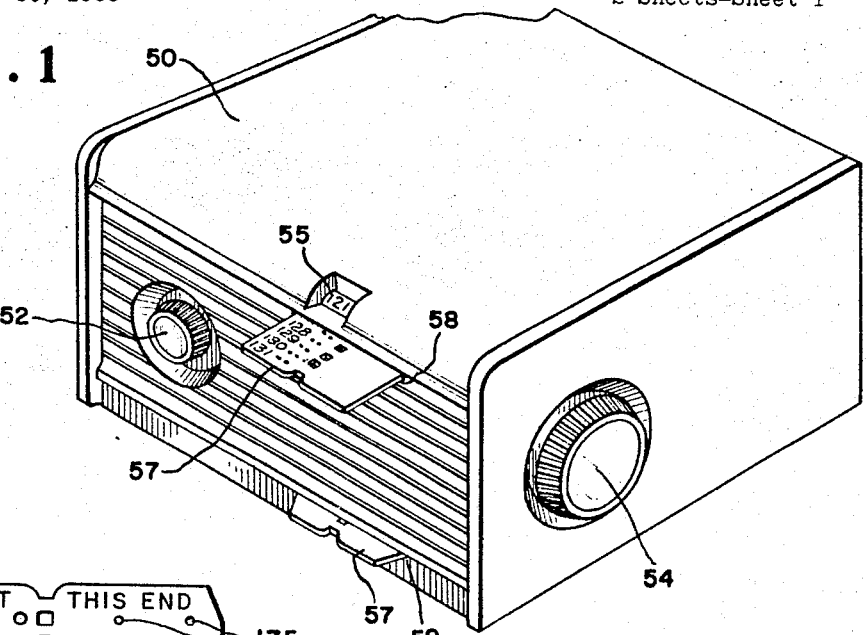

May 9, 1967 E. M. ROSCHKE 3,319,257
HEAT PIERCING RECORDER
Filed June 30, 1965 2 Sheets-Sheet 1

INVENTOR.
Erwin M. Roschke
BY
Attorney

May 9, 1967 E. M. ROSCHKE 3,319,257
HEAT PIERCING RECORDER
Filed June 30, 1965 2 Sheets-Sheet 2

INVENTOR.
Erwin M. Roschke
BY
*James E. Tracy*
Attorney 3,319,257
HEAT PIERCING RECORDER
Erwin M. Roschke, Des Plaines, Ill., assignor to Zenith Radio Corporation, Chicago, Ill., a corporation of Delaware
Filed June 30, 1965, Ser. No. 468,492
5 Claims. (Cl. 346—76)

This invention relates to a recording apparatus for registering information on a recording medium. The invention is particularly useful in a subscription television receiver of the type wherein charges are registered on a removable recording medium only for those selected programs to which the subscriber actually subscribes; hence, the invention will be described in that environment.

Recording arrangements have been developed in which registration of information is achieved by punching or piercing apertures in a removable strip or card, the specific locations of the punched perforations representing the information. For example, charge or use recording in a subscription television receiver may be realized by punching a hole in a card, by means of a movable punch or lancing pin, each time a subscription program is viewed. The punched card is returned to the subscription television operating company and a bill is prepared in an amount based on the charge information represented by the perforations.

Card punching is effective to provide a permanent record. Unfortunately, such a method is disadvantageous in at least two respects. Firstly, there is a problem of disposing of the chad, namely the small punched or cutout areas of the card, in order that the chad does not foul up or deleteriously affect the operation of the recording mechanism. Secondly, the necessity of lancing pins or punches to make the perforations means that a certain minimum number of moving parts is required. Both of these shortcomings may be overcome by the employment of a fixed thermal device or heating element which, in response to each energization, burns out or heat pierces a localized area of the recording medium to produce a perforation.

Heat piercing may, however, produce ash and possibly fumes which contaminate or deleteriously affect some of the elements in close proximity. The recording apparatus of the present invention also employs heat piercing of a recording medium to effect registration of information but yet this is achieved without resulting in any undesirable ash or fumes.

Accordingly, it is an object of the present invention to provide a new and improved recording apparatus.

It is another object to provide a novel recording mechanism for a subscription television receiver.

Briefly, a recording apparatus constructed in accordance with the present invention comprises a recording device having a restricted-area heating element. There is a recording medium including a thin sheet of pre-stressed, heat-shrinkable material a predetermined localized area of which is in juxtaposition with the heating element. Means are provided for maintaining portions of the recording medium outside the predetermined area in fixed space relation with the heating element. The recording apparatus also includes means for energizing the heating element to produce an aperture in the heat-shrinkable material within the predetermined area.

The features of this invention which are believed to be new are set forth with particularity in the appended claims. The invention, together with further objects and advantages thereof, may best be understood, however, by reference to the following description in conjunction with the accompanying drawings in which:

FIGURES 1-6 depict recording apparatus to be us in a subscription television receiver, and illustrate embodiment of the invention.

Copending patent application Ser. No. 468,486, fil concurrently herewith, in the name of Pentti V. Sarlur and assigned to the present assignee, discloses, in one its embodiments, a subscription television receiver which charge information is recorded on a recordi medium, in the form of a removable strip or card, punching perforations in the card. The recording appai tus, to be described in the present application, is also fu described in the Sarlund application and constitutes modification of Sarlund's card punching arrangeme. All of the elements disclosed herein are shown and c scribed in greater detail in the Sarlund case; according reference is made thereto for a more complete descr: tion of the recording apparatus of the present applic tion. Only so much is shown herein as is necessary illustrate the invention.

The subscription television receiver disclosed in Si lund, and in which receiver the present invention is i corporated, includes an adjustable code-determini switching apparatus that must be established in a diff( ent condition of adjustment for each subscription te vision program before the coded television signal for t program may be decoded and intelligibly reproduce The switching apparatus has a series of input switch cc tacts and a series of output switch contacts and ea different condition of adjustment provides a differe prescribed interconnection pattern between the input a: output contacts. Code signal components, applied the input switch contacts, are permuted by the switchi apparatus and are then used for decoding the televisi signal. The establishment of different interconnecti patterns is achieved by means of a multi-position, coc bearing perforated insulating strip or card which is a justably supported between the input and output contac and which is the same card that is punched to regist charges. In each position of the card, a different a unique pattern of perforations is interposed between t input and output contacts to permutably connect the Directing attention to FIGURES 1-4, all of the c cuitry and equipment required to convert a conventior television receiver to a subscription television receiver housed within a metal cabinet 50. Preferably, cabinet is mounted on top of or in close proximity to the te vision receiver and a cable (not shown) provides t necessary circuit connections therebetween.

A control knob 52 positioned on the front of cabir 50 is connected to an operating shaft (not shown) whi operates a switch which has the effect of functiona including the decoding equipment into the television i ceiver when it is desired to convert the television set f subscription television reception. Positioned on the si of cabinet 50 exposed in FIGURE 1 is a manual conti knob 54 which must be adjusted by the subscriber establish the switching apparatus in the required con tion of adjustment for any given program. Cabinet has a display window in the form of a magnifying vie ing lens 55.

Figure 2:
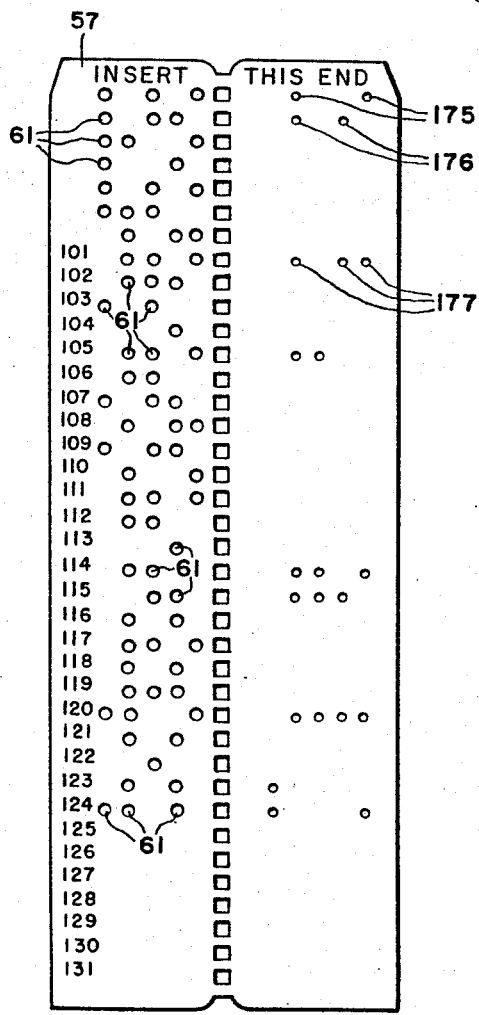

The perforated insulating strip is provided by a flexit card 57, shown by itself in FIGURE 2, which is thread through the sensing or reading equipment within cabii 50, being fed into the cabinet through input slot 58 a emerging by way of exit slot 59. Perforated card has a series of thirty-one distinct operating positions w respect to the reading apparatus and, in a manner fu explained in the concurrently filed Sarlund applicatic is transported in step-by-step fashion from one positi to the next by a rotor assembly that is rotated by ro tion of control knob 54. In each of the thirty-one d ferent positions, a unique pattern of perforations 61, in the left half of strip 57 as viewed in FIGURE 2, is interposed between the input switch contacts and the output switch contacts. As mentioned previously, each pattern of perforations permutably connects the input to the output switch contacts in accordance with a different interconnection pattern. The thiry-one different numbers (101–131) displayed or printed along the left margin of strip 57 (FIGURE 2) may be referred to as code numbers and are employed to facilitate the selection of the correct pattern of perforations required for each different program. For any given program, knob 54 is rotated by the subscriber until a prescribed one of the code numbers 101–131 on card 57 is exposed through window 55. As shown in FIGURE 1, the code number 121 is revealed and this indicates that the perforation pattern associated with that number is effective, namely is interposed between the input and output switch contacts.

As explained in the copending Sarlund case, holes may be punched in the right half of card 67 by one or more of five movable lancing pins to register a separate charge for each of the selected programs to which the subscriber actually subscribes. A correlation testing arrangement is employed to insure that a charge is registered for a given program only after it has been established that the switching apparatus has been correctly positioned to the required setting for that program. Each recorded charge takes the form of one or more apertures representing in binary notation a charge sequence number. The position of the hole or holes, forming any given binary number, with respect to the length dimension of card 57 is determined by the code number displayed in window 55; hence, that particular position is indicative of the pattern of perforations 61 employed for a given program, which pattern is unique to that program. The position of apertures 175, for example, indicates that the pattern of perforations 61 designated by code number 101 has been employed to decode a selected program. Hence, holes 175 indicate the identity of one particular program to which the subscriber has subscribed. The number and position of perforations 175, with respect to the transverse or width dimension of card 57, represent the charge squence number in binary notation. Specifically, the two apertures 175 represent the binary number 01001 whose decimal equivalent is 9. Since the charge register in Sarlund contains five lancing pins, the representation of thirty-one different charge sequence numbers 1–31 may be achieved.

Card 57 indicates that the next program to which the subscriber subscribes is that requiring the pattern of apertures 61 associated with code number 102. When knob 54 is rotated to display code number 102 the decoding apparatus functions to decode the telecast and the charge register actuates to punch the two apertures 176 representing the binary number 01010, the decimal equivalent of which is 10. The next program viewed by the subscriber requires the perforations associated with code number 107. The charge register in the Sarlund case effects the piercing of the three apertures 177 indicative of the binary number 01011 or decimal number 11.

As revealed in FIGURE 2, six subsequent programs are subscribed to resulting in the registration of charges that represent in succession decimal numbers 12–17.

The charge register, fully described in the Sarlund application, thus records on removable code card 57 separate charges each representing a charge sequence number as well as the identity of a particular one of the selected programs to which the subscriber subscribes. Each recorded charge has one characteristic (its position along the length dimension of the card) to indicate program identification and another characteristic (the binary representation) denoting the charge sequence number, both of the characteristics changing from one program to the next. The advantage of sequence counting of the recorded charges is explained in Sarlund.

Punching out holes by means of piercing pins is a satisfactory way to register charges. As is the case with most punching or piercing devices, however, chad (cut out portions) results. Of course, it is desirable that the chad not foul up the operation of the charge register. Chadless type punches are available but they have the disadvantage that it is sometimes difficult to readily detect the holes punched. In accordance with the present invention, readily discernible holes are pierced in a recording medium without producing any undesirable chad.

Before the invention to which this application is directed is considered, however, preliminary consideration will be given to the charge register shown in FIGURES 1, 3 and 4. That charge register, which is also fully described in the Sarlund application, is capable of producing the same holes in the right half of card 57 as described hereinbefore to record charges. Instead of using a series of five movable lancing pins, the function of piercing holes in a recording medium is performed by a series of five aligned thermal devices or heating elements 191 (only one of which is shown) mounted in a fixed position within a stator support 93. Depending on the position of code card 57, each of the five heating elements 191 is adjacent a different localized area of the card. One terminal of each heating element 191 is connected via a conductor 192 to a terminal of a source of energizing potential (not shown) and the other terminal of each thermal device is connected by a conductor 193 to an assigned respective one of a series of five metallic electrically conductive sensing elements 194 (only one of which is shown) which are mounted to but insulated from a fixed bracket 121. Each of the five sensing elements 194 lines up with an assigned one of five notched, cam discs 132, only one of which is shown. The periphery of each disc 132 is broken up with a series of irregularly spaced notches of varying width. The discs are made of some appropriate electrically conductive metallic material in order that they may be constantly established at a ground potential through other metallic members of the charging apparatus. The terminal of the energizing potential source which is not connected to each conductor 192 is grounded.

In response to energization of a solenoid 149 (controlled by the correlation testing circuitry), each of the five cam discs 132 moves toward the right (as viewed in FIGURE 3), in a manner fully described in the concurrently filed Sarlund application, and in so doing certain ones of the five sensing arms 194 will be grounded, as determined by the portions of the discs adjacent the sensing arms. In other words, if a disc 132 has an un-notched or raised section adjacent the free end of the associated sensing arm 194, that arm will engage the raised portion and establish an electrical connection to ground. Grounding of a conductor 193 completes the energizing circuit for the associated thermal device 191, causing that device to heat a localized area of code card 57. Of course, card 57 should be heat sensitive in order that energization of heating element 191 heats the area of the card in juxtaposition with the heating element to the extent that an aperture is actually produced or burned out of code card 57.

Figure 3:
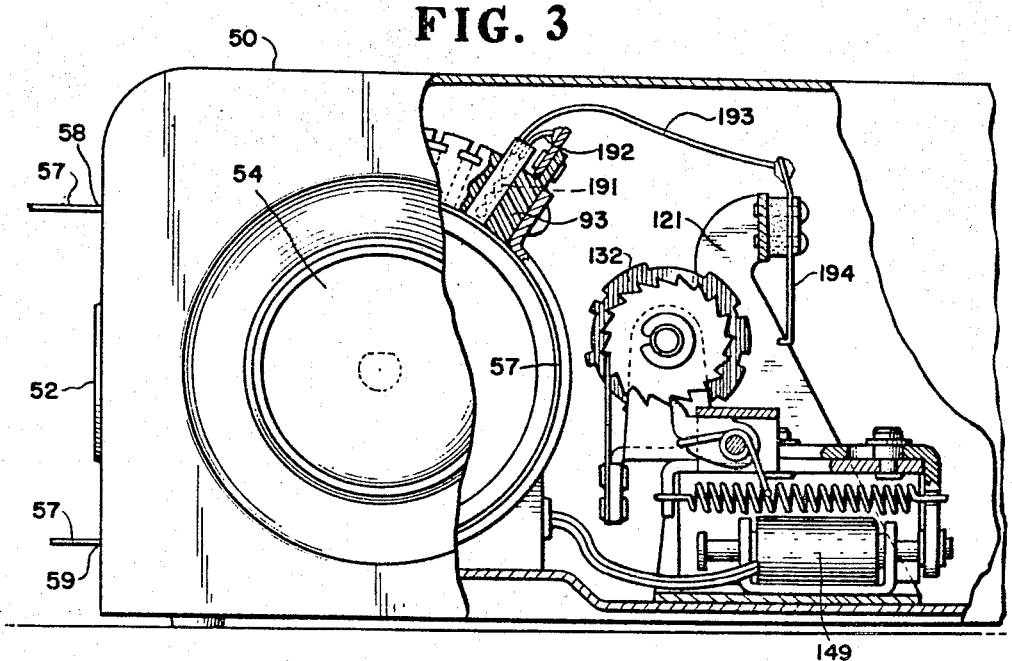
Figure 4:
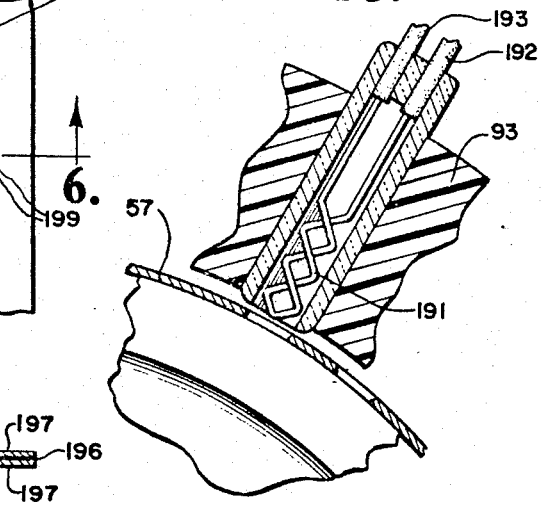
Figure 6:
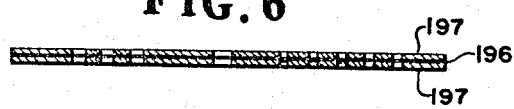

As a consequence, the heat piercing arrangement of FIGURES 1, 3 and 4 facilitates the recording of separate charges for each program in the form of holes, as in the case of the punching arrangement of the Sarlund application, which represent program identification and charge sequence. However, there is no chad. Moreover, the system of FIGURES 1, 3 and 4 requires fewer movable parts than that of the punching arrangement of Sarlund's.

In brief, FIGURES 1, 3 and 4 illustrate recording apparatus for registering information on a heat sensitive recording medium 57. Each thermal device 191 responds to a predetermined energization for selectively heating a localized area of the recording medium.

Burning perforations in card 57 has the disadvantage that ash may result along with fumes which may conceivably contaminate electrical contacts within the subscription television receiver. Such a disadvantage is eliminated, in accordance with the present invention, by means of the laminated strip 198 shown in FIGURES 5 and 6 and which is adapted to be used in the charge register shown by FIGURES 1, 3 and 4. The recording medium itself takes the form of a thin film or sheet of pre-stressed, heat-shrinkable material 196, such as polyethylene. In the illustrated embodiment, the heat-shrinkable material 196 is flaccid and laminated between two self-supporting laminations 197 which may be made of cardboard.

Figure 5:
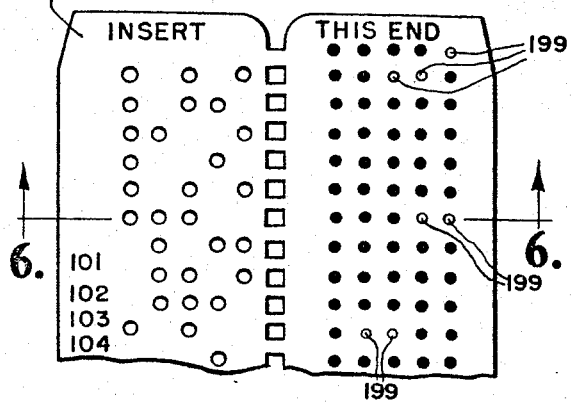

The left half of laminated strip 198, as viewed in FIGURE 5, includes perforations that extend through all three laminations or layers and correspond to perforations 61 of the code card of FIGURE 2. In the right half of strip 198, aligned holes are pre-cut or pre-punched in both laminations 197 and these apertures are positioned so that they will be selectively placed in juxtaposition with the five heating elements 191. Before any recording occurs, thin film 196 of heat-shrinkable material is continuous and extends across all of the perforations pre-punched in laminations 197. Whenever an area of film 196, defined by a pair of aligned perforations in laminations 197, is heated by a heating device 191 an aperture will be developed in that area.

Specifically, heat from the thermal device 191 causes the thin film 196 to open since the molecules in the thin film are under stress and would be permitted to relax. The flow in the thin film would thereby cause an opening. However, no ash or fumes are produced. Reference numbers 199 designate the areas of thin film 196 that have been heat pierced. All of the blackened or filled in circles in the right half of card 198 in FIGURE 5 illustrate localized areas of film 196, exposed through the pre-punched apertures of the top lamination 197, that have not been subjected to the restricted-area heating of a thermal device 191.

Laminations 197 not only serve as a support for flaccid thin film 196, but in addition the pre-punched perforations in the laminations confine the size of the apertures produced by the heating element. The laminations provide a heat shield to prevent undue enlargement of a single hole.

Hence, in accordance with the present invention, thin film 196 provides a recording medium including a thin sheet of pre-stressed, heat-shrinkable material predetermined localized areas of which are adapted to be placed, one at a time, in juxtaposition with the restricted-area heating elements 191. Laminations 197 maintain portions of recording medium 196, outside the predetermined areas, in fixed space relation with the heating elements. Energization of the heating elements 191 produce apertures in heat-shrinkable material 196 within the predetermined areas.

Certain features described in the present application are disclosed and claimed in the following copending applications filed concurrently herewith: Ser. Nos. 468,484, in the name of Emil C. Walker; and 468,493, in the name of James C. Gaudio, both of which are assigned to the present assignee.

While a particular embodiment of the invention has been shown and described, modifications may be made, and it is intended in the appended claims to cover all such modifications as may fall within the true spirit and scope of the invention.

I claim:

1. Recording apparatus for registering information, comprising:
    a recording device having a restricted-area heating element;
    a recording medium including a thin sheet of pre-stressed, heat-shrinkable material a predetermined localized area of which is placed in juxtaposition with said heating element;
    means for maintaining portions of said recording medium outside said predetermined area in fixed space relation with said heating element;
    and means for energizing said heating element to produce an aperture in said heat-shrinkable material within said predetermined area.

2. Recording apparatus for registering information comprising.
    a recording device having a restricted-area heating element;
    a recording medium including a thin sheet of pre-stressed, heat-shrinkable material predetermined localized areas of which are selectively placed one at a time in juxtaposition with said heating element
    means for maintaining portions of said recording medium outside said predetermined areas in fixed space relation with said heating element;
    means for changing the relative positions of said recording medium and heating element to select the particular localized area of said heat-shrinkable material that is to be adjacent said heating element;
    and means for energizing said heating element to produce an aperture in said heat-shrinkable material within the selected localized area.

3. Recording apparatus for registering information comprising:
    a removable laminated strip including a self-supporting lamination having a multiplicity of perforations, and a flaccid lamination of pre-stressed, heat-shrinkable material affixed to said self-supporting lamination and extending across said perforations;
    and means including a restricted-area heating element for selectively heating at least certain ones of the areas of said heat-shrinkable material defined by said perforations resulting in the development of apertures in said material.

4. Recording apparatus for registering information comprising:
    a removable strip composed of at least partially of thin flaccid sheet of pre-stressed, heat-shrinkable material;
    a heating element;
    means for holding said strip and heating element in fixed relative position such that a predetermined area of said heat-shrinkable material lies immediately adjacent said heating element;
    and means for energizing said heating element to produce an aperture in said heat-shrinkable material within said predetermined area.

5. Recording apparatus for registering information comprising:
    a removable strip composed at least partially of a heat shrinkable material;
    a heating element adjacent a localized area of said removable strip and which, when energized, heats that area;
    means for changing the relative positions of said strip and heating element to select the particular area of said strip that is to be adjacent said heating element
    and means for energizing said heating element to melt portion of said heat-shrinkable material to heat-pierce an aperture in said strip.

References Cited by the Examiner

UNITED STATES PATENTS

| 2,350,382 | 6/1944 | Angel | 178—112 |
| 2,539,874 | 1/1951 | Stockfleth | 219—27 |
| 3,134,834 | 5/1964 | Tobios et al. | 235—61.12 |
| 3,183,518 | 5/1965 | Henry et al. | 346—7 |

RICHARD B. WILKINSON, *Primary Examiner.*

J. H. HARTARY, *Assistant Examiner.*